United States Patent
Liao et al.

(10) Patent No.: US 11,305,976 B1
(45) Date of Patent: Apr. 19, 2022

(54) FUNNEL

(71) Applicant: KTL INTERNATIONAL CO., LTD., Taichung (TW)

(72) Inventors: Ying-Chieh Liao, Taichung (TW); Yu-Kuo Liao, Taichung (TW)

(73) Assignee: KTL INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 17/338,284

(22) Filed: Jun. 3, 2021

(51) Int. Cl.
*B67C 11/02* (2006.01)
*B67C 11/00* (2006.01)
*B01D 29/085* (2006.01)

(52) U.S. Cl.
CPC .............. *B67C 11/00* (2013.01); *B01D 23/28* (2013.01); *B67C 2011/30* (2013.01)

(58) Field of Classification Search
CPC ...... B67C 11/00; B67C 2011/30; B01D 23/28
USPC .................................. 141/300–343, 340–343
See application file for complete search history.

(56) References Cited

U.S. PATENT DOCUMENTS

| | | | | |
|---|---|---|---|---|
| 1,676,986 A * | 7/1928 | Hilford | ............. | B67C 11/02 141/300 |
| 4,497,585 A * | 2/1985 | Paull | ............. | G01K 13/25 374/158 |
| 5,219,006 A * | 6/1993 | Bishop | ............. | A47J 19/005 141/1 |
| 5,381,839 A * | 1/1995 | Dowd | ............. | B65B 3/30 141/237 |
| 5,676,185 A * | 10/1997 | Starr | ............. | B67C 11/02 141/300 |
| 6,083,392 A * | 7/2000 | Rigney | ............. | A47J 37/1271 210/451 |
| 6,340,038 B1 * | 1/2002 | Ingram | ............. | B67C 11/02 141/333 |
| 6,739,363 B2 * | 5/2004 | Walter | ............. | B67C 11/02 141/331 |
| 8,567,456 B1 * | 10/2013 | Francis | ............. | B67C 11/02 141/332 |
| 9,038,677 B2 * | 5/2015 | Keefe | ............. | A47J 31/404 141/109 |

(Continued)

FOREIGN PATENT DOCUMENTS

| | | | | |
|---|---|---|---|---|
| DE | 202021103048 U1 * | 8/2021 | ............ | B67C 11/02 |
| JP | 3233676 U * | 8/2021 | | |
| TW | M-617413 U * | 9/2021 | | |

OTHER PUBLICATIONS

JP-3233676-U English Translation of Specification (Year: 2021).*

(Continued)

*Primary Examiner* — Timothy P. Kelly
*Assistant Examiner* — Stephanie A Shrieves
(74) *Attorney, Agent, or Firm* — Muncy, Geissler, Olds & Lowe, PC

(57) ABSTRACT

A funnel is provided, including: a main body, being a transparent plastic member which is integrally formed of one piece by injection, including an enlarged section, an intermediate section and a joint section which are connected in sequence in an axial direction, the intermediate section being in communication with and between the enlarged section and the joint section, the main body being provided with an exhaust conduit, the exhaust conduit being in communication with an interior of the joint section and in communication with an outside of the funnel.

11 Claims, 5 Drawing Sheets

(56) References Cited

U.S. PATENT DOCUMENTS 10,604,396 B2 * 3/2020 Liao .................. B67C 11/02

OTHER PUBLICATIONS

DE-202021103048-U1 English Translation of Specification (Year: 2021).*
TWM-617413-U English Translation of Specification (Year: 2021).*

* cited by examiner

FUNNEL

BACKGROUND OF THE INVENTION

Field of the Invention

The present invention relates to a funnel.

Description of the Prior Art

Liquid is easy to leak out when it is transferred from a container to another container by directly pouring, which results in soiled environment, difficult cleaning and other issues. Therefore, some funnels are developed to receive liquid with a larger liquid inlet and transfer the liquid to another container via a main body of the funnel so as to solve the problems described above.

However, although this type of funnels solved the problem that liquid leaked out when the liquid is poured, it does not provide easy observation on the pouring and flowing of the liquid.

The present invention is, therefore, arisen to obviate or at least mitigate the above-mentioned disadvantages.

SUMMARY OF THE INVENTION

The main object of the present invention is to provide a funnel which is light-pervious and air-eliminable.

To achieve the above and other objects, a funnel is provided, including: a main body, being a transparent plastic member which is integrally formed of one piece by injection, including an enlarged section, an intermediate section and a joint section which are connected in sequence in an axial direction, the intermediate section being in communication with and between the enlarged section and the joint section, the main body being provided with an exhaust conduit, the exhaust conduit being in communication with an interior of the joint section and in communication with an outside of the funnel.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
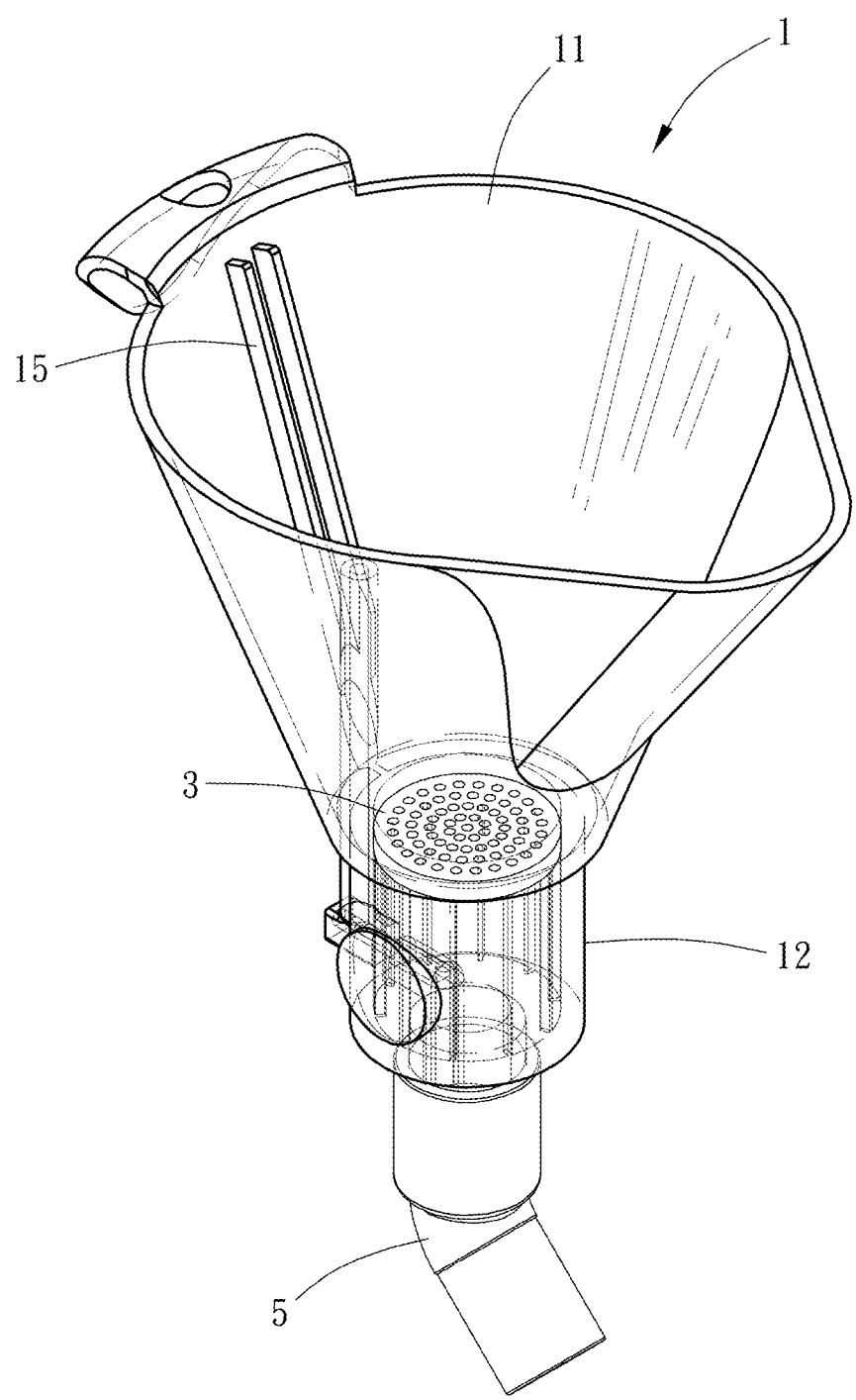
FIG. 1 is a stereogram of a preferable embodiment of the present invention.
Figure 2:
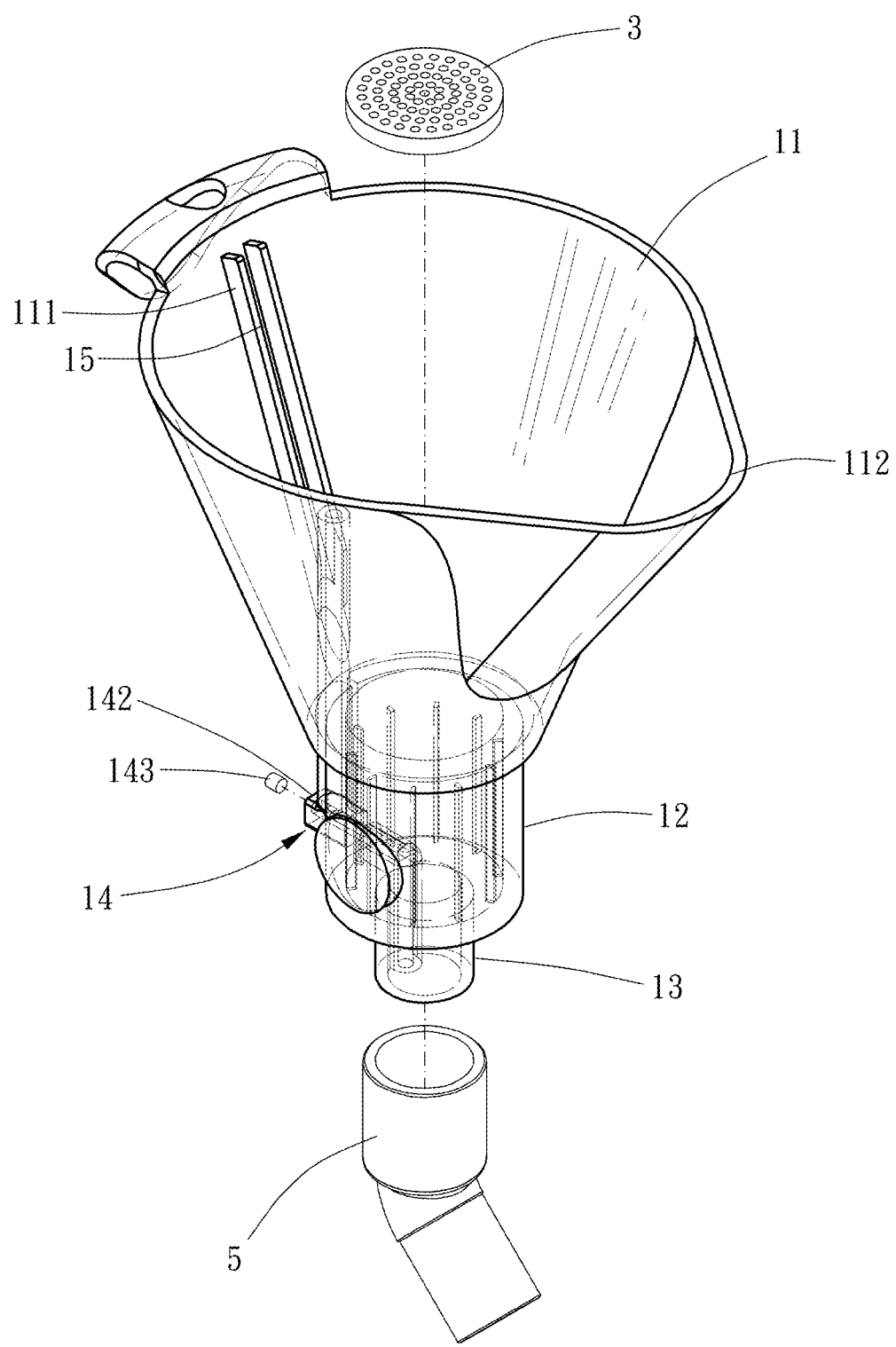
FIG. 2 is a breakdown drawing of a preferable embodiment of the present invention.
Figure 3:
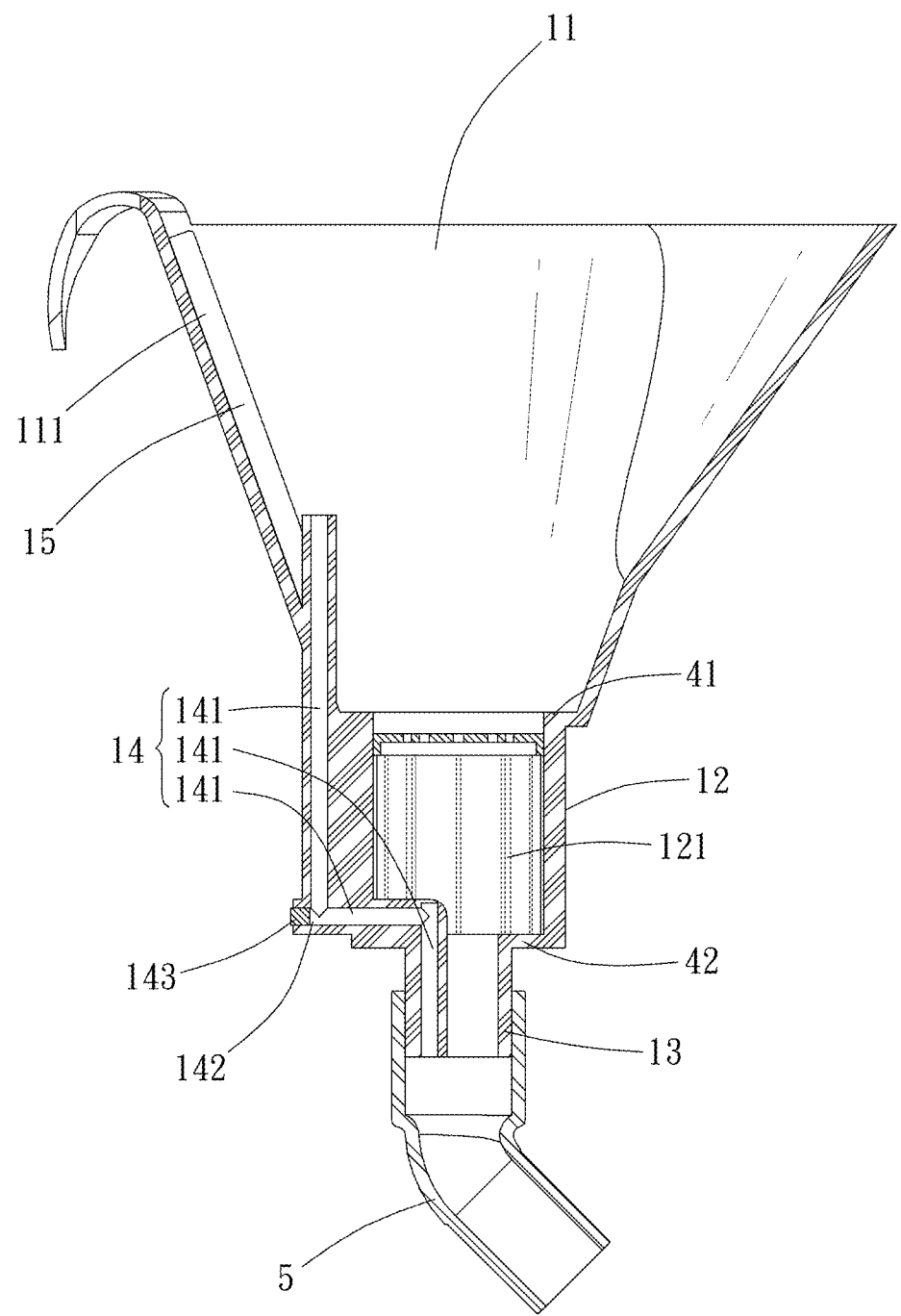
FIG. 3 is a cross-sectional view of a preferable embodiment of the present invention.
Figure 4:
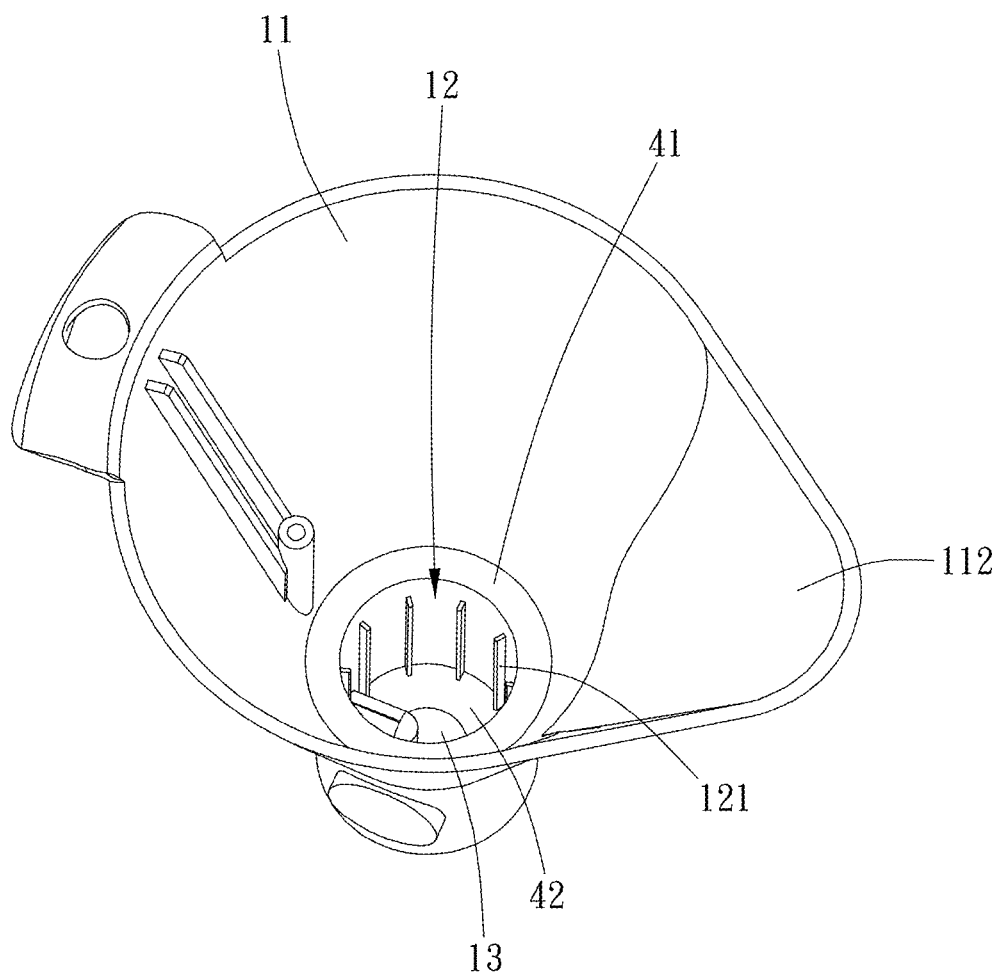
FIG. 4 is another stereogram of a preferable embodiment of the present invention.

Please refer to FIGS. 1 to 5 for a preferable embodiment of the present invention. A funnel of the present invention includes a main body 1.

The main body 1 is a transparent plastic member which is integrally formed of one piece by injection, and the main body 1 includes an enlarged section 11, an intermediate section 12 and a joint section 13 which are connected in sequence in an axial direction The intermediate section 12 is in communication with and between the enlarged section 11 and the joint section 13. The main body 1 is provided with an exhaust conduit 14, and the exhaust conduit 14 is in communication with an interior of the joint section 13 and in communication with an outside of the funnel. Liquid can flow from the enlarged section 11, through the intermediate section 12, to the joint section 13 and then into the liquid flows into a container. The intermediate section 12 can slow down the flow of the liquid into the joint section 13 and eliminate air during injection of the liquid into the container.

The enlarged section 11, the intermediate section 12 and the joint section 13 are transparent so that the state of flowing of the liquid can be clearly observed. The exhaust conduit 14 is configured for exhausting air in the container so that the liquid can flow into the container without affection of air and so that air cannot move back, through the intermediate section 12, into the enlarged section 11 so as to prevent splash of the liquid due to burst of bubbles. In this embodiment, the intermediate section 12 and the joint section 13 are hollow and cylindrical, the enlarged section 11 includes a spout 112 remote from the intermediate section 12, and the spout 112 radially extends and tapers outward.

Specifically, the exhaust conduit 14 extends to be within an interior of the enlarged section 11 and protrusive from an inner surface of the enlarged section 11. Preferably, the exhaust conduit 14 is transparent and integrally formed as a portion of the main body 1; however, the exhaust conduit may be additionally mounted to the main body 1, and may be non-transparent.

Figure 5:
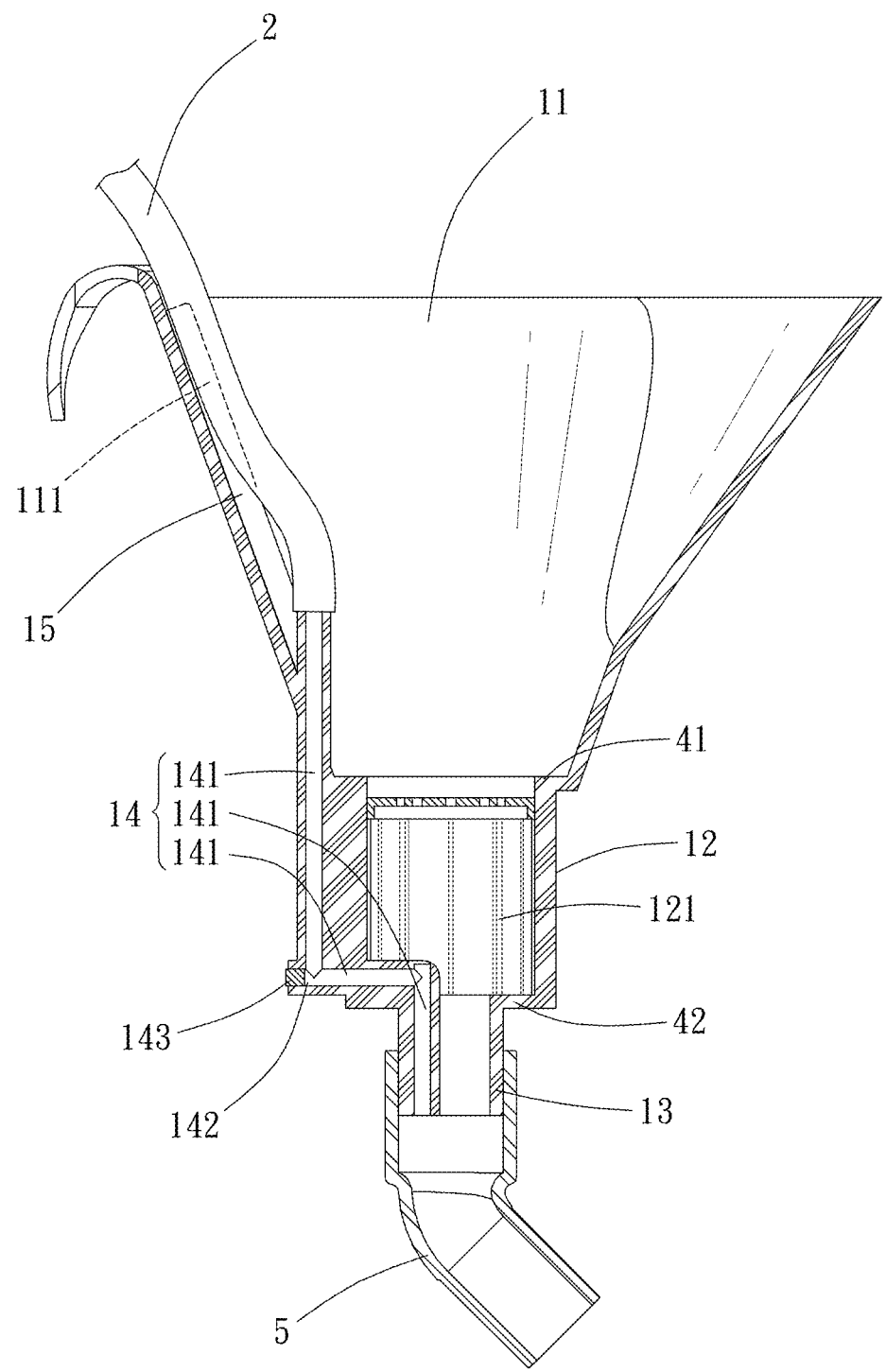
FIG. 5 is another cross-sectional view of a preferable embodiment of the present invention.

Preferably, the enlarged section 11 includes a groove 15 on the inner surface thereof, an end of the groove 15 is adjacent to an end of the exhaust conduit 14 protrusive from the inner surface of the enlarged section 11, and another end of the groove 15 extends toward an end of the enlarged section 11 remote from the intermediate section 12. In this embodiment, the funnel further includes a pipe 2 (as shown in FIG. 5), the pipe 2 is engaged within the groove 15 and detachably connected with the end of the exhaust conduit 14 protrusive from the inner surface of the enlarged section 11, which prevents movement of the pipe 2. The pipe 2 serves as a higher exhaust outlet which is surely beyond the surface level of the liquid in the enlarged section 11.

In this embodiment, two first ribs 111 are disposed on the inner surface of the enlarged section 11, the two first ribs 111 define the groove 15 therebetween, and the two first ribs 111 are connected to two sides of the end of the exhaust conduit 14 protrusive from the inner surface of the enlarged section 11.

The funnel further includes a sieve 3, the sieve 3 is positioned between the intermediate section 12 and the enlarged section 11, and the sieve 3 is configured to filter fluid flowing from the enlarged section 11 to the intermediate section 12. Preferably, a plurality of second ribs 121 are disposed on an inner surface of the intermediate section 12, the plurality of second ribs 121 extend in the axial direction, and the sieve 3 is positionally rested on the plurality of second ribs 121. The plurality of second ribs 121 further provides the aid for guiding the liquid.

In this embodiment, a diametric dimension of the enlarged section 11 is greater than a diametric dimension of the intermediate section 12, and a first shoulder 41 is disposed between an inner surface of the enlarged section 11 and an inner surface of the intermediate section 12; a diametric dimension of the intermediate section 12 is greater than a diametric dimension of the joint section 13, a second shoulder 42 is disposed between an inner surface of the intermediate section 12 and an inner surface of the joint section 13. The first shoulder 41 is configured for abutment of an pouring container (such as an oil bottle), and the second shoulder 42 can buffer the liquid.

Specifically, the exhaust conduit 14 includes at least two extension sections 141, and every neighboring two of the at least two extension sections 141 extend perpendicularly relative to each other. In this embodiment, the exhaust conduit 14 includes three extension sections 141, a first one of the three extension sections 141 extends in the axial direction on the enlarged section 11 and the intermediate section 12, a second one of the three extension sections 141 extends in a direction lateral to the axial direction on the intermediate section 12, and a third one of the three extension sections 141 extends in the axial direction on the joint section 13. The first and third ones of the three extension sections 141 may be integrally formed together with the main body 1 by injection, the third on of the three extension sections 141 may be formed by drilling after the main body 1 is formed. The second extension section 141 includes a through hole 142 radially through the circumferential wall of the intermediate section 12, a plug 143 is detachably disposed within the through hole 142 to block communication between the second one of the three extension sections 141 and the outside of the funnel.

Specifically, the plurality of second ribs 121 are connected to the second shoulder 42, which increases structural strength of the intermediate section 12; each of the plurality of second ribs 121 does not extend axially beyond the second shoulder 42; an adapter tube 5 is detachably connected to the joint section 13, and the adapter tube 5 extends curvedly, for connection with a tilted spout of a container.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A funnel, including:
a main body, being a transparent plastic member which is integrally formed of one piece by injection, including an enlarged section, an intermediate section and a joint section which are connected in sequence in an axial direction, the intermediate section being in communication with and between the enlarged section and the joint section, the main body being provided with an exhaust conduit-, the exhaust conduit being in communication with an interior of the joint section and in communication with an outside of the funnel;
wherein the exhaust conduit extends to be within an interior of the enlarged section and protrusive from an inner surface of the enlarged section;
wherein the enlarged section includes a groove on the inner surface thereof, an end of the groove is adjacent to an end of the exhaust conduit protrusive from the inner surface of the enlarged section, and another end of the groove extends toward an end of the enlarged section remote from the intermediate section.

2. The funnel of claim 1, wherein two first ribs are disposed on the inner surface of the enlarged section, the two first ribs define the groove therebetween, and the two first ribs are connected to two sides of the end of the exhaust conduit protrusive from the inner surface of the enlarged section.

3. The funnel of claim 2, further including a pipe, wherein the pipe is engaged within the groove and detachably connected with the end of the exhaust conduit protrusive from the inner surface of the enlarged section; further including a sieve, wherein the sieve is positioned between the intermediate section and the enlarged section, and the sieve is configured to filter fluid flowing from the enlarged section to the intermediate section; a plurality of second ribs are disposed on an inner surface of the intermediate section, the plurality of second ribs extend in the axial direction, and the sieve is rested on the plurality of second ribs at a side opposite to the joint section; a diametric dimension of the enlarged section is greater than a diametric dimension of the intermediate section, and a first shoulder is disposed between the inner surface of the enlarged section and the inner surface of the intermediate section; a diametric dimension of the intermediate section is greater than a diametric dimension of the joint section, and a second shoulder is disposed between the inner surface of the intermediate section and an inner surface of the joint section; the exhaust conduit includes at least two extension sections, and every neighboring two of the at least two extension sections extend perpendicularly relative to each other; the at least two extension sections includes three extension sections, a first one of the three extension sections extends in the axial direction on the enlarged section and the intermediate section, a second one of the three extension sections extends in a direction lateral to the axial direction on the intermediate section, and a third one of the three extension sections extends in the axial direction on the joint section; the second one of the three extension sections includes a through hole disposed through the intermediate section, and a plug is detachably disposed within the through hole; the exhaust conduit is transparent and integrally formed as a portion of the main body; the intermediate section and the joint section are hollow and cylindrical, the enlarged section includes a spout remote from the intermediate section, the spout radially extends and tapers outward; the plurality of second ribs are connected to the second shoulder; each of the plurality of second ribs does not extend axially beyond the second shoulder; an adapter tube is detachably connected to the joint section, and the adapter tube extends curvedly.

4. The funnel of claim 1, further including a pipe, wherein the pipe is engaged within the groove and detachably connected with the end of the exhaust conduit protrusive from the inner surface of the enlarged section.

5. The funnel of claim 1, wherein a diametric dimension of the enlarged section is greater than a diametric dimension of the intermediate section, and a first shoulder is disposed between the inner surface of the enlarged section and an inner surface of the intermediate section.

6. The funnel of claim 1, wherein a diametric dimension of the intermediate section is greater than a diametric dimension of the joint section, and a second shoulder is disposed between an inner surface of the intermediate section and an inner surface of the joint section.

7. The funnel of claim 1, wherein the exhaust conduit includes at least two extension sections, and every neighboring two of the at least two extension sections extend perpendicularly relative to each other.

8. The funnel of claim 7, wherein the at least two extension sections includes three extension sections, a first one of the three extension sections extends in the axial direction on the enlarged section and the intermediate section, a second one of the three extension sections extends in a direction lateral to the axial direction on the intermediate section, and a third one of the three extension sections extends in the axial direction on the joint section.

9. The funnel of claim 8, wherein the second one of the three extension sections includes a through hole disposed through the intermediate section, and a plug is detachably disposed within the through hole.

10. The funnel of claim 1, wherein the exhaust conduit is transparent and integrally formed as a portion of the main body.

11. A funnel, including:
- a main body, being a transparent plastic member which is integrally formed of one piece by injection, including an enlarged section, an intermediate section and a joint section which are connected in sequence in an axial direction, the intermediate section being in communication with and between the enlarged section and the joint section, the main body being provided with an exhaust conduit, the exhaust conduit being in communication with an interior of the joint section and in communication with an outside of the funnel;
- a sieve, wherein the sieve is positioned between the intermediate section and the enlarged section, and the sieve is configured to filter fluid flowing from the enlarged section to the intermediate section;
- wherein a plurality of second ribs are disposed on an inner surface of the intermediate section, the plurality of second ribs extend in the axial direction, and the sieve is rested on the plurality of second ribs at a side opposite to the joint section.

\* \* \* \* \*